United States Patent
Colson

(10) Patent No.: US 11,209,222 B1
(45) Date of Patent: Dec. 28, 2021

(54) SPIRAL HEAT EXCHANGER HEADER

(71) Applicant: Hamilton Sundstrand Corporation, Charlotte, NC (US)

(72) Inventor: Paul M. Colson, Westfield, MA (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 16/998,684

(22) Filed: Aug. 20, 2020

(51) Int. Cl.
  *F28F 9/02* (2006.01)
  *F28F 9/24* (2006.01)

(52) U.S. Cl.
  CPC .............. *F28F 9/0282* (2013.01); *F28F 9/24* (2013.01)

(58) Field of Classification Search
  CPC ... F28F 9/0282; F28F 9/24; F28F 9/02; F28D 1/0472; F28D 2001/0273; F28D 7/02; F28D 7/0041
  USPC ........................................................ 165/109.1
  See application file for complete search history.

(56) References Cited

U.S. PATENT DOCUMENTS

| | | | |
|---|---|---|---|
| 266,060 A | 10/1882 | Johnson | |
| 1,655,086 A | 1/1928 | Blanding | |
| 1,768,222 A * | 6/1930 | Uhde | F28D 7/024 165/163 |
| 1,913,573 A | 6/1933 | Turner | |
| 2,693,346 A * | 11/1954 | Petersen | F28D 7/024 165/160 |
| 2,734,224 A | 2/1956 | Winstead | |
| 2,798,361 A | 7/1957 | Hiersch | |
| 3,205,939 A | 9/1965 | Huet | |
| 3,212,570 A | 10/1965 | Holman | |
| 3,240,675 A | 3/1966 | Weber | |
| 4,058,161 A | 11/1977 | Trepaud | |
| 4,066,121 A | 1/1978 | Kleine et al. | |
| 4,451,960 A | 6/1984 | Molitor | |
| 4,570,703 A | 2/1986 | Ringsmuth et al. | |
| 5,213,156 A * | 5/1993 | Eriksson | F28D 7/024 165/158 |

(Continued)

FOREIGN PATENT DOCUMENTS

| | | |
|---|---|---|
| DE | 202019102083 U1 | 4/2019 |
| EP | 0074570 A2 | 3/1983 |

(Continued)

OTHER PUBLICATIONS

Extended European Search Report for European Patent Application No. 19216295.6, dated Jul. 22, 2020, 7 pages.

(Continued)

*Primary Examiner* — Jon T. Schermerhorn, Jr.
(74) *Attorney, Agent, or Firm* — Kinney & Lange, P.A.

(57) ABSTRACT

A heat exchanger header includes a first stage with a first unit and a second stage with second units. The first unit includes a first branched region, a first common axis, and first fluid channels. Each of the first fluid channels includes a first end and a second end, wherein each of the first fluid channels defines a first spiral path with respect to the first common axis. Each of the second units includes a second branched region, a second common axis, and second fluid channels. Each of the second fluid channels includes a first end and a second end, wherein each of the second fluid channels defines a second spiral path with respect to the second common axis. Each of the second ends of the first fluid channels is connected to one of the second branched regions.

20 Claims, 7 Drawing Sheets

(56) References Cited

U.S. PATENT DOCUMENTS

| | | | |
|---|---|---|---|
| 5,388,635 A | | 2/1995 | Gruber et al. |
| 5,551,504 A | * | 9/1996 | Zifferer .............. B21C 37/151 |
| | | | 165/155 |
| 6,296,020 B1 | | 10/2001 | Mcneely et al. |
| 6,679,083 B1 | | 1/2004 | Erickson |
| 6,688,381 B2 | | 2/2004 | Pence et al. |
| 7,021,608 B2 | | 4/2006 | Lavemann et al. |
| 7,240,723 B2 | | 7/2007 | Wu et al. |
| 8,241,239 B2 | | 8/2012 | Solomon et al. |
| 8,528,628 B2 | | 9/2013 | Robinson |
| 9,134,072 B2 | * | 9/2015 | Roisin .................. F28D 7/0041 |
| 9,279,621 B2 | | 3/2016 | Seybold et al. |
| 9,541,331 B2 | | 1/2017 | Nagorny et al. |
| 9,605,912 B2 | * | 3/2017 | Neal ....................... F28D 7/024 |
| 9,656,212 B2 | | 5/2017 | Dibiasio et al. |
| 9,964,077 B2 | * | 5/2018 | Neal ...................... F28D 7/1607 |
| 9,976,815 B1 | | 5/2018 | Roper et al. |
| 10,048,019 B2 | | 8/2018 | Karlen et al. |
| 10,088,250 B2 | | 10/2018 | Turney |
| 10,267,515 B2 | * | 4/2019 | Adriany ..................... F02K 9/52 |
| 10,684,080 B2 | * | 6/2020 | Moore .................. B33Y 10/00 |
| 2003/0039169 A1 | | 2/2003 | Ehrfeld |
| 2004/0195708 A1 | | 10/2004 | Lavemann et al. |
| 2008/0190586 A1 | | 8/2008 | Robinson |
| 2009/0269837 A1 | | 10/2009 | Shevkopiyas et al. |
| 2009/0274549 A1 | | 11/2009 | Mitchell et al. |
| 2009/0316972 A1 | | 12/2009 | Borenstein et al. |
| 2010/0096115 A1 | | 4/2010 | Erickson |
| 2010/0297535 A1 | | 11/2010 | Das et al. |
| 2012/0125560 A1 | | 5/2012 | Mckeown et al. |
| 2013/0206374 A1 | | 8/2013 | Roisin et al. |
| 2014/0262136 A1 | * | 9/2014 | Jensen ................... F24T 10/15 |
| | | | 165/45 |
| 2015/0140190 A1 | | 5/2015 | Cully et al. |
| 2016/0116218 A1 | | 4/2016 | Shedd et al. |
| 2017/0030651 A1 | | 2/2017 | Rock, Jr. et al. |
| 2017/0089643 A1 | | 3/2017 | Arafat |
| 2017/0191762 A1 | | 7/2017 | Duesler et al. |
| 2017/0205149 A1 | | 7/2017 | Herring et al. |
| 2017/0248372 A1 | | 8/2017 | Erno et al. |
| 2017/0328644 A1 | | 11/2017 | Takahashi |
| 2018/0038654 A1 | | 2/2018 | Popp et al. |
| 2018/0051934 A1 | | 2/2018 | Wentland et al. |
| 2018/0100703 A1 | | 4/2018 | Beaver et al. |
| 2018/0100704 A1 | | 4/2018 | Lewandowski et al. |
| 2018/0106550 A1 | | 4/2018 | Nelson et al. |
| 2018/0266770 A1 | | 9/2018 | Wagner et al. |
| 2018/0283794 A1 | | 10/2018 | Cerny et al. |
| 2018/0283795 A1 | * | 10/2018 | Cerny ....................... F28F 9/02 |
| 2019/0024989 A1 | | 1/2019 | Wilson et al. |
| 2019/0086154 A1 | | 3/2019 | Adriany et al. |
| 2019/0366290 A1 | | 12/2019 | Hofmann et al. |
| 2020/0041212 A1 | | 2/2020 | Palmer et al. |
| 2020/0263928 A1 | | 8/2020 | Joseph et al. |
| 2020/0284516 A1 | | 9/2020 | Becene et al. |
| 2020/0284517 A1 | | 9/2020 | Becene et al. |
| 2020/0284518 A1 | * | 9/2020 | Becene .................. F28D 7/005 |
| 2020/0284519 A1 | * | 9/2020 | Becene .................... F02C 7/14 |
| 2020/0284531 A1 | | 9/2020 | Maynard et al. |
| 2020/0284532 A1 | | 9/2020 | Becene et al. |
| 2020/0318910 A1 | | 10/2020 | Ruiz et al. |
| 2020/0318913 A1 | | 10/2020 | Ruiz et al. |
| 2021/0071964 A1 | | 3/2021 | Ruiz et al. |

FOREIGN PATENT DOCUMENTS

| | | |
|---|---|---|
| EP | 3124906 A1 | 2/2017 |
| EP | 3410054 A1 | 12/2018 |
| FR | 453494 A | 6/1913 |
| GB | 588520 A | 5/1947 |
| JP | 2006322643 A | 11/2006 |
| WO | 2010138061 A1 | 12/2010 |
| WO | 2017052798 A1 | 3/2017 |
| WO | 2018154063 A1 | 8/2018 |
| WO | 2018182808 A1 | 10/2018 |
| WO | WO2018191787 A1 | 10/2018 |

OTHER PUBLICATIONS

Extended European Search Report for European Patent Application No. 19216221.2, dated Jul. 28, 2020, 7 pages.
Extended European Search Report for European Patent Application No. 19216146.1, dated Jul. 22, 2020, 8 pages.
Extended European Search Report for European Patent Application No. 19213258.7, dated May 8, 2020, 9 pages.
Extended European Search Report for European Patent Application No. 19215931.7, dated Jul. 28, 2020, 8 pages.
Luo et al.: "Constructal approach and multi-scale components", Applied Thermal Engineering, Pergamon, Oxford, GB, vol. 27, No. 10, Mar. 29, 2007 pp. 1708-1714.
Luo et al., "Experimental study of constructional distributor for flow equidistribution in a mini crossflow heat exchanger (MCHE)", Chemical Engineering and Processing: Process Intensification, Elsevier Sequoia, Lausanne, CH, vol. 47, No. 2, Nov. 12, 2007, pp. 229-236, XP022339718, ISSN: 0255-2701, DOI: 10.1016/J.CEP.2007.02.028.
Fan Z et al.: "Numerical Investigation of Constructal Distributors with Different Configurations", Chinese Journal of Chemical Engineering, Chemical Industry Press, Beijing, CN, vol. 17, No. 1, Feb. 1, 2009, pp. 175-178, XP026005280, ISSN: 1004-9541, DOI: 10.1016/S1004-9541(09)60052-5 [retrieved on Feb. 1, 2009].
Luo et al.: "Integration of Constructal distributors to a mini corssflow heat exchangerand their assembly configured optimization". Chemical Engineer Science, Oxford, GB, vol. 62, No. 13, Jun. 2, 2007, pp. 3605-3619, XP022104105, ISSN: 0009-2509.
Communication pursuant to Article 94(3) EPC for European U.S. Appl. No. 19/216,221 2, dated Oct. 27, 2021, 6 pages.
Extended European Search Report for European Patent Application No. 2117619.7, dated Nov. 9, 2021, 8 pages.

\* cited by examiner

SPIRAL HEAT EXCHANGER HEADER

BACKGROUND

This disclosure relates generally to heat exchangers, and more specifically to heat exchanger headers.

Heat exchangers are well known in many industries for a variety of applications, including mobile applications where space can be limited. Heat exchangers provide a highly effective means of exchanging heat from a hot fluid to a cold fluid. Conventional heat exchangers typically include inlet and outlet headers or manifolds connected to a core. These components can operate in a cross-flow, counter-flow, or parallel-flow arrangement.

Further, heat exchangers can operate in high temperature environments, such as in modern aircraft engines. Heat exchangers that operate at elevated temperatures can have reduced service lives due to high thermal stresses. Thermal stress can be caused by uneven temperature distribution within the heat exchanger or with abutting components, component stiffness, geometry discontinuity, and/or other material properties of the heat exchanger.

SUMMARY

In one example, a heat exchanger header includes a first stage with a first unit and a second stage with second units. The first unit includes a first branched region, a first common axis passing through a center of the first branched region, and first fluid channels extending from the first branched region. Each of the first fluid channels includes a first end forming a portion of the first branched region and a second end opposite the first end, wherein each of the first fluid channels defines a first spiral path with respect to the first common axis. Each of the second units includes a second branched region, a second common axis passing through a center of the second branched region, and second fluid channels extending from the second branched region. Each of the second fluid channels includes a first end forming a portion of the second branched region and a second end opposite the first end, wherein each of the second fluid channels defines a second spiral path with respect to the second common axis. Each of the second ends of the first fluid channels is connected to one of the second branched regions, such that each of the second branched regions is connected to one of the second ends of the first fluid channels.

In another example, a heat exchanger includes headers and a core. Each of the headers includes a first stage with a first unit and a second stage with second units. The first unit includes a first branched region, a first common axis passing through a center of the first branched region, and first fluid channels extending from the first branched region. Each of the first fluid channels includes a first end forming a portion of the first branched region and a second end opposite the first end, wherein each of the first fluid channels defines a first spiral path with respect to the first common axis. Each of the second units includes a second branched region, a second common axis passing through a center of the second branched region, and second fluid channels extending from the second branched region. Each of the second fluid channels includes a first end forming a portion of the second branched region and a second end opposite the first end, wherein each of the second fluid channels defines a second spiral path with respect to the second common axis. Each of the second ends of the first fluid channels is connected to one of the second branched regions, such that each of the second branched regions is connected to one of the second ends of the first fluid channels. The core is connected to each of the headers distal to the first branched regions.

DETAILED DESCRIPTION

A spiral header for a heat exchanger is disclosed herein. The heat exchanger header includes stages of branched fluid channels with spiral (or helical) geometries. The spiral geometry mitigates additive manufacturing packaging and build limitations and allows for increased compliance and thermal performance compared to conventional heat exchanger headers. The spiral geometry can also improve heat transfer by reducing the amount of external flow that can bypass through the header, further allowing for tuning of the spiral shape to control pressure drop and heat transfer to maximize overall heat exchanger performance. The spiral heat exchanger header is described below with reference to FIGS. 1A-4B.

Figure 1A:
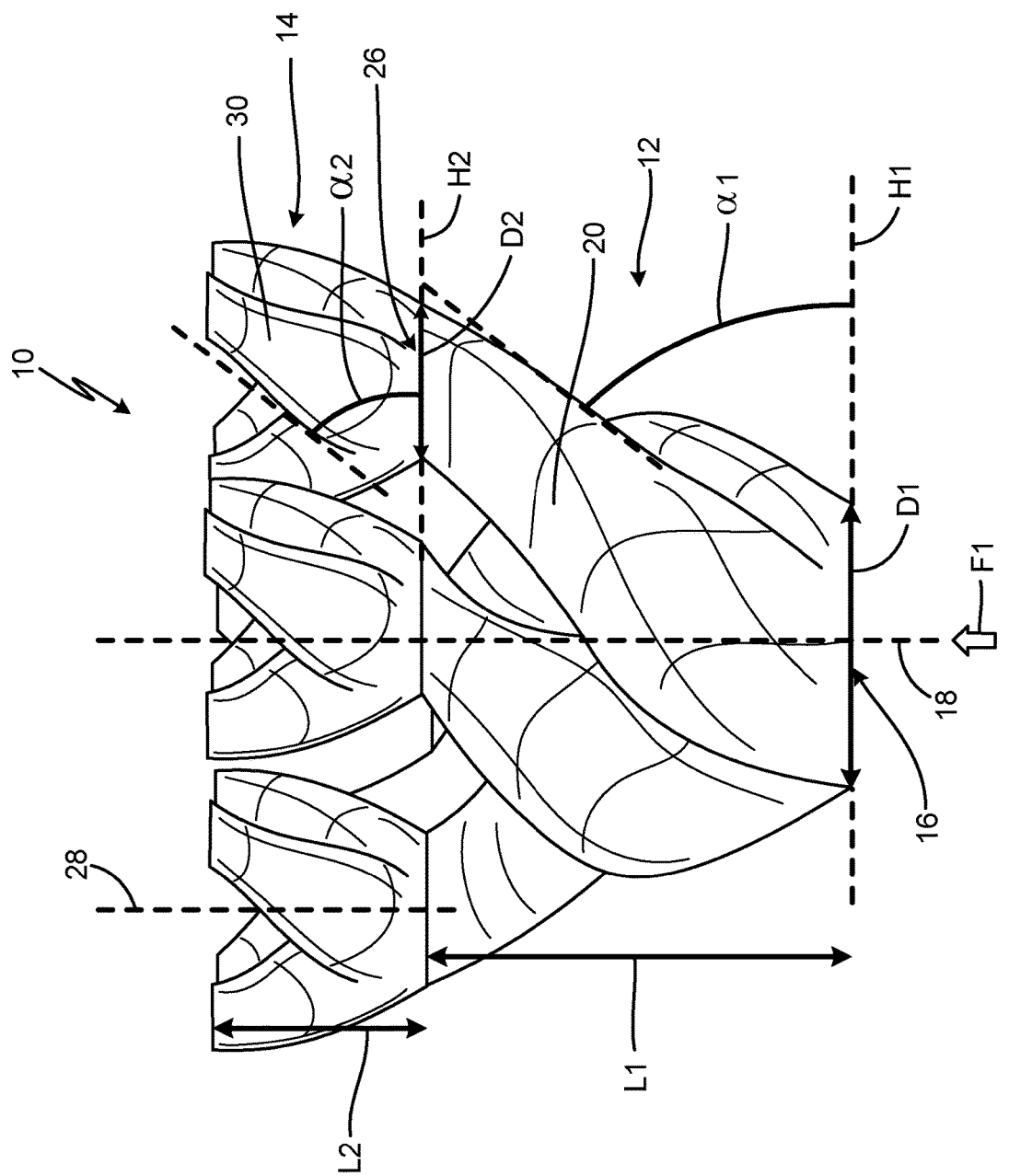
FIG. 1A is a perspective side view of a heat exchanger header.
Figure 1B:
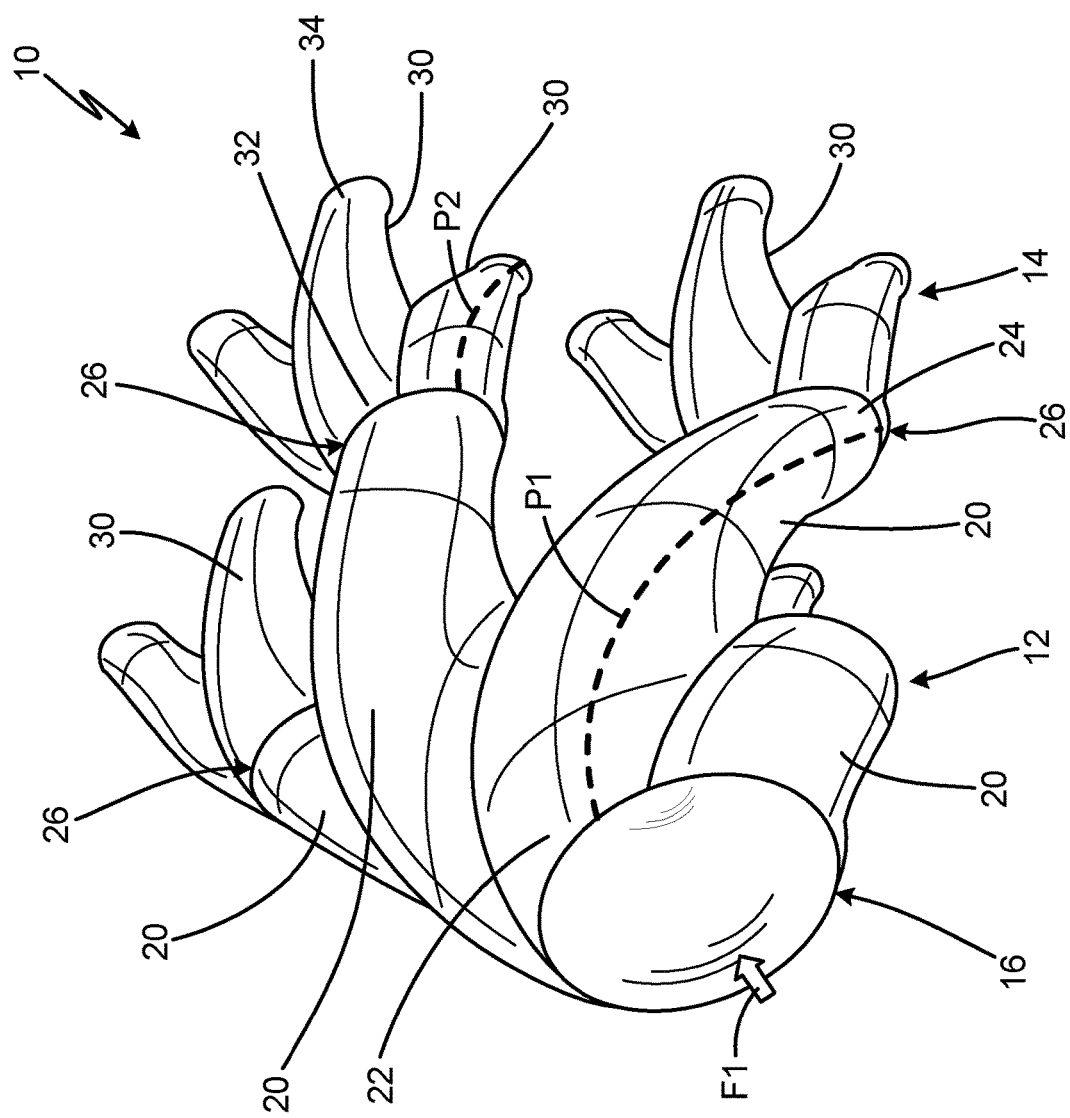
FIG. 1B is an isometric view of a heat exchanger header.
Figure 1C:
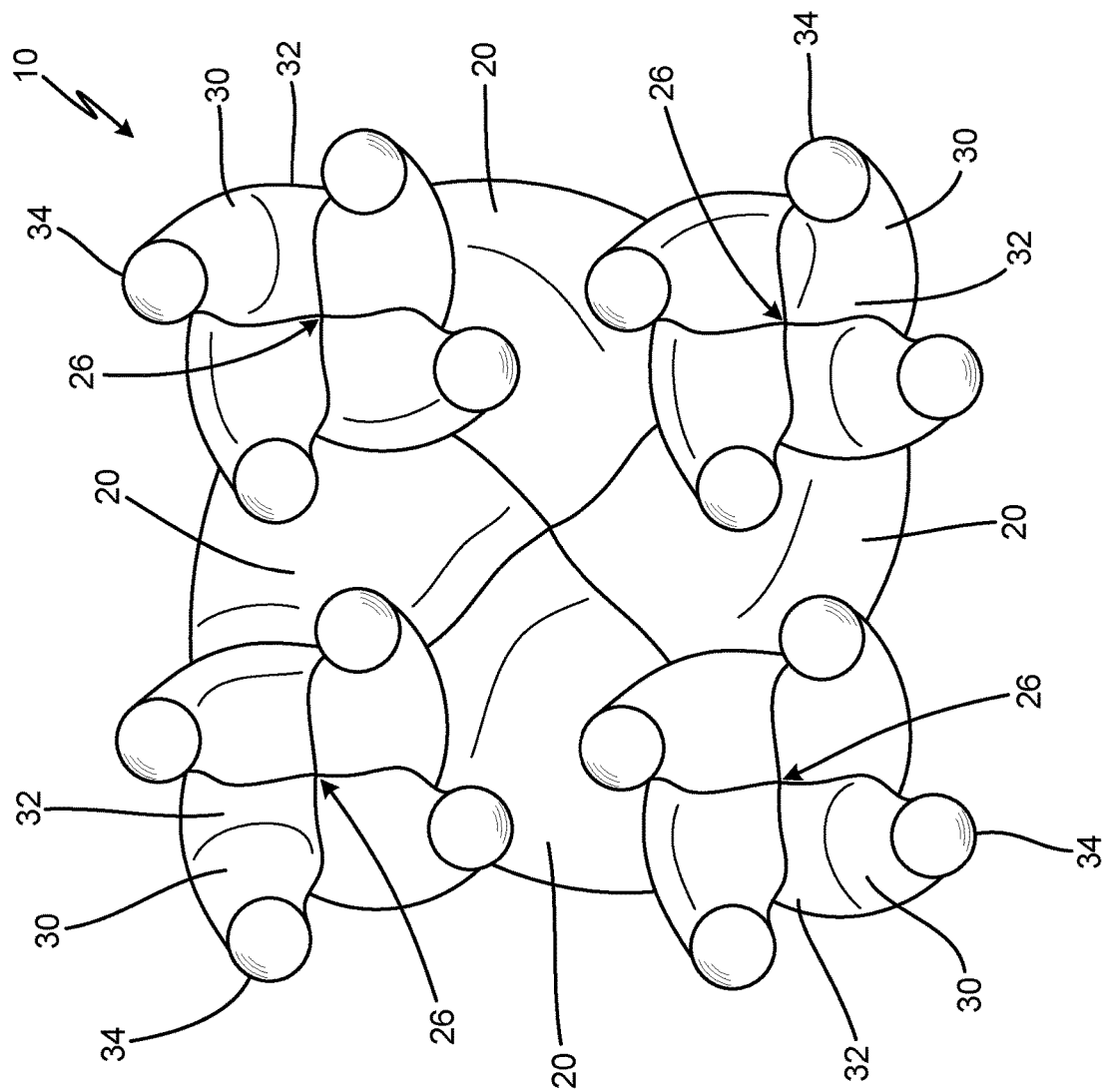
FIG. 1C is a perspective front view of a heat exchanger header.

FIG. 1A is a perspective side view of heat exchanger header 10. FIG. 1B is an isometric view of heat exchanger header 10. FIG. 1C is a perspective front view of heat exchanger header 10. For purposes of clarity and ease of discussion, FIGS. 1A, 1B, and 1C will be discussed together. Heat exchanger header 10 includes first stage 12 and second stage 14. First stage 12 includes first branched region 16 with first common axis 18 and first fluid channels 20. Each of first fluid channels 20 includes first end 22 and second end 24. First fluid channels 20 define first spiral paths P1, first helical diameters D1, first lengths L1, and first rotational angles α1 with respect to first horizontal plane H1. Second stage 14 includes second branched regions 26 with second common axes 28 and second fluid channels 30. Each of second fluid channels 30 includes first end 32 and second end 34. Second fluid channels 30 define second spiral paths P2, second helical diameters D2, second lengths L2, and second rotational angles α2 with respect to second horizontal plane H2.

First stage 12 is a first level or layer of branching within header 10. First branched region 16 is open on one end and, as such, forms an opening into the fluid system of header 10. Opposite the open end, first branched region 16 branches into first fluid channels 20. Thus, first branched region 16 can define a corresponding unit or bundle of first fluid channels 20. First fluid channels 20 are tubular. In the embodiment shown in FIGS. 1A, 1B, and 1C, first branched region 16 branches into four individual first fluid channels 20. In other embodiments, first branched region 16 can branch into any number of first fluid channels 20.

First fluid channels 20 are connected to first branched region 16 at first ends 22. In particular, first ends 22 of first fluid channels 20 form structural portions of first branched region 16. For example, as is most easily viewed in FIG. 1B, the walls of first fluid channels 20 (at first ends 22) can merge at first branched region 16. Thus, first branched region 16 can define an initial common plenum or interior space within header 10 that is continuous with an interior of first fluid channels 20.

Each of first fluid channels 20 is wound into a spiral or helix to define a corresponding first spiral path P1. In this embodiment, first spiral paths P1 are helical paths, each of which can have the same helical pitch, first helical diameter D1 (as measured adjacent to first branched region 16 at first ends 22), and helical twist direction (e.g., right-handed or left-handed). First spiral paths P1 can be conical spirals or any other suitable spiral or helical geometry. In the example shown in FIGS. 1A, 1B, and 1C, each of first fluid channels 20 has a right-handed helical twist direction (i.e., first fluid channels 20 curve in a clockwise direction), though it should be appreciated that each of first fluid channels 20 can alternatively have a left-handed helical twist direction (i.e., first fluid channels 20 can curve in a counter-clockwise direction), as is described in greater detail below with respect to FIG. 3.

All of first fluid channels 20 can share first common axis 18. First common axis 18 is a longitudinal axis passing through a center of first branched region 16 that can form a central helical axis for each of first spiral paths P1. Helical pitch can refer to the number of turns or revolutions of a given one of first spiral paths P1 around first common axis 18 for a fixed length along first common axis 18. Each first fluid channel 20 also defines first length L1 measured along a line drawn parallel to first common axis 18 from first ends 22 to second ends 24. Due to the spiral shape of first fluid channels 20, first spiral paths P1 of spirally or helically wound first fluid channels 20 always have a greater length than the corresponding first length L1 of the same first fluid channel 20.

Although the helical pitch, helical diameter, size, and spacing of first fluid channels 20 are illustrated in FIGS. 1A, 1B, and 1C as being uniform among each of first fluid channels 20, it should be appreciated that such parameters may vary between individual first fluid channels 20 or even along first spiral paths P1 depending on the application and/or the characteristics of the heat exchange fluid to be passed through first fluid channels 20. For example, the helical pitch of first fluid channels 20 may be uniform or may vary along first spiral paths P1. In addition, each of first fluid channels 20 may have a similar or different size, spacing, etc. According to the illustrated embodiment, first fluid channels 20 all have substantially the same cross-sectional area at corresponding points along first spiral paths P1. The cross-sectional area of each individual first fluid channel 20 can be substantially constant or can vary from first end 22 to second end 24. In particular, the cross-sectional area of each individual first fluid channel 20 can decrease from first end 22 to second end 24, such that each of first fluid channels 20 is tapered toward second end 24. Moreover, the cross-sectional area of each of first fluid channels 20 can be substantially circular. However, it should be appreciated that the cross-sectional area and the geometry of the cross sections of first fluid channels 20 can be uniform or may vary from channel to channel or along first spiral paths P1 of a particular first fluid channel 20. It should also be appreciated that the cross-sectional area of each first fluid channel 20 need not be circular and can alternatively be oval, polygonal, irregular, or any other suitable cross-sectional shape.

Each of first spiral paths P1 also defines a corresponding first rotational angle $\alpha 1$ (i.e., helical angle) based on the first helical diameter D1 and the helical pitch of the individual first spiral path P1. Specifically, each first rotational angle $\alpha 1$ is formed by a tangent line taken at a point along the corresponding first spiral path P1 and measured with respect to first horizontal plane H1. First horizontal plane H1 can be perpendicular to first common axis 18 and include first helical diameters D1. Each of first rotational angles $\alpha 1$ can be the same. Moreover, each of first rotational angles $\alpha 1$ can be between 30 and 70 degrees depending on the overall geometry of header 10, material characteristics, and manufacture process parameters. For example, each of first rotational angles $\alpha 1$ can be equal to 45 degrees.

First stage 12 is connected to second stage 14 at each of second ends 24 (of first fluid channels 20). Second stage 14 is a second level or layer of branching within header 10. Second branched regions 26 extend from second ends 24 of first fluid channels 20. Specifically, each of second ends 24 is connected to one second branched region 26, such that each of second branched regions 26 is connected to one second end 24. Thus, the ratio of second ends 24 to second branched regions 26 can be 1:1. For example, as shown in FIGS. 1A, 1B, and 1C, four first fluid channels 20 with second ends 24 can connect to four second branched regions 26. Further, the total cross-sectional area of header 10 as measured through second branched regions 26 can be equal to the cross-sectional area as measured through first branched region 16, such that an initial cross-sectional area of each stage (i.e., first stage 12 and second stage 14) of header 10 remains constant between subsequent stages.

Each second branched region 26 branches into second fluid channels 30, such that each second branched region 26 defines a corresponding unit or bundle of second fluid channels 30. For example, the illustrated embodiment includes four units of second fluid channels 30 corresponding to four second branched regions 26. Second fluid channels 30 are tubular. In the embodiment shown in FIGS. 1A, 1B, and 1C, header 10 has a fractal geometry and each of second branched regions 26 branches into four individual second fluid channels 30 (for a total of sixteen second fluid channels 30). In other embodiments, second branched regions 26 can branch into any number of second fluid channels 30. In yet other embodiments, the number of second fluid channels 30 extending from a particular second branched region 26 can vary among second branched regions 26.

Second fluid channels 30 are connected to second branched regions 26 at first ends 32. In particular, first ends 32 of second fluid channels 30 form structural portions of a corresponding second branched region 26. For example, as is most easily viewed in FIG. 1B, the walls of second fluid channels 30 (at first ends 32) can merge at a corresponding second branched region 26. Thus, each second branched region 26 can define a common plenum or interior space within header 10 that is continuous with an interior of the corresponding second fluid channels 30.

Each of second fluid channels 30 within a unit of second stage 14 is wound into a spiral or helix to define a corresponding second spiral path P2. In this embodiment, second spiral paths P2 are helical paths, each of which can have the same helical pitch, second helical diameter D2 (as measured adjacent to the corresponding second branched region 26 at first ends 32), and helical twist direction (e.g., right-handed or left-handed). Second spiral paths P2 can be conical spirals or any other suitable spiral or helical geometry. In the example shown in FIGS. 1A, 1B, and 1C, each of second fluid channels 30 has a right-handed helical twist direction (i.e., second fluid channels 30 curve in a clockwise direction), though it should be appreciated that each of second fluid channels 30 can alternatively have a left-handed helical twist direction (i.e., second fluid channels 30 can curve in a counter-clockwise direction).

Each unit of second fluid channels 30 shares a second common axis 28. Second common axes 28 are longitudinal axes passing through a center of each second branched region 26. Thus, each second common axis 28 can form a central helical axis for corresponding second spiral paths P2. Each of second common axes 28 can be parallel. Further, each of second common axes 28 can be parallel to first common axis 18. Helical pitch can refer to the number of turns or revolutions of a given one of second spiral paths P2 around a corresponding second common axis 28 for a fixed length along that second common axis 28. Each second fluid channel 30 also defines second length L2 measured along a line drawn parallel to the corresponding second common axis 28 from first ends 32 to second ends 34. Due to the spiral shape of second fluid channels 30, second spiral paths P2 of spirally or helically wound second fluid channels 30 always have a greater length than the corresponding second length L2 of the same second fluid channel 30.

Although the helical pitch, helical diameter, size, and spacing of second fluid channels 30 are illustrated in FIGS. 1A, 1B, and 1C as being uniform among each unit of second fluid channels 30, it should be appreciated that such parameters may vary between individual second fluid channels 30 or even along second spiral paths P2 depending on the application and/or the characteristics of the heat exchange fluid to be passed through second fluid channels 30. For example, the helical pitch of second fluid channels 30 may be uniform or may vary along second spiral paths P2. In addition, each of second fluid channels 30 may have a similar or different size, spacing, etc. According to the illustrated embodiment, second fluid channels 30 all have substantially the same cross-sectional area at corresponding points along second spiral paths P2. The cross-sectional area of each individual second fluid channel 30 can be substantially constant or can vary from first end 32 to second end 34. In particular, the cross-sectional area of each individual second fluid channel 30 can decrease from first end 32 to second end 34, such that each of second fluid channels 30 is tapered toward second end 34. Moreover, the cross-sectional area of each of second fluid channels 30 can be substantially circular (FIG. 1C). However, it should be appreciated that the cross-sectional area and the geometry of the cross sections of second fluid channels 30 can be uniform or may vary from channel to channel or along second spiral paths P2 of a particular second fluid channel 30. It should also be appreciated that the cross-sectional area of each second fluid channel 30 need not be circular and can alternatively be oval, polygonal, irregular, or any other suitable cross-sectional shape. Furthermore, any of the helical pitch, helical diameter, size, and spacing of second fluid channels 30 can be the same as or different from the helical pitch, helical diameter, size, and spacing of first fluid channels 20.

Each of second spiral paths P2 also defines a corresponding second rotational angle α2 (i.e., helical angle) based on the second helical diameter D2 and the helical pitch of the individual second spiral path P2. Specifically, each second rotational angle α2 is formed by a tangent line taken at a point along the corresponding second spiral path P2 and measured with respect to second horizontal plane H2. Second horizontal plane H2 can be perpendicular to second common axes 28 and include second helical diameters D2. Second horizontal plane H2 can be parallel to first horizontal plane H1. Each of second rotational angles α2 can be the same. In other embodiments, second rotational angles α2 can vary among units of second fluid channels 30. Each of second rotational angles α2 can also be the congruent to each of first rotational angles α1. Moreover, each of second rotational angles α2 can be between 30 and 70 degrees depending on the overall geometry of header 10, material characteristics, and manufacture process parameters. For example, each of second rotational angles α2 can be equal to 45 degrees.

Second ends 34 of second fluid channels 30 can form an end of header 10 that is distal to first branched region 16. Second ends 34 of second fluid channels 30 can be connected to additional stages of branching within header 10 (e.g., as is described in greater detail below with respect to FIG. 2) or to a heat exchanger core (e.g., as is described in greater detail below with respect to FIGS. 4A and 4B).

Any tubular components of header 10, such as first fluid channels 20 and/or second fluid channels 30 can further include secondary heat transfer elements (not shown). The secondary heat transfer elements can be included within an interior of first fluid channels 20 and/or second fluid channels 30. The secondary heat transfer elements can be of any suitable type or configuration.

Figure 4A:
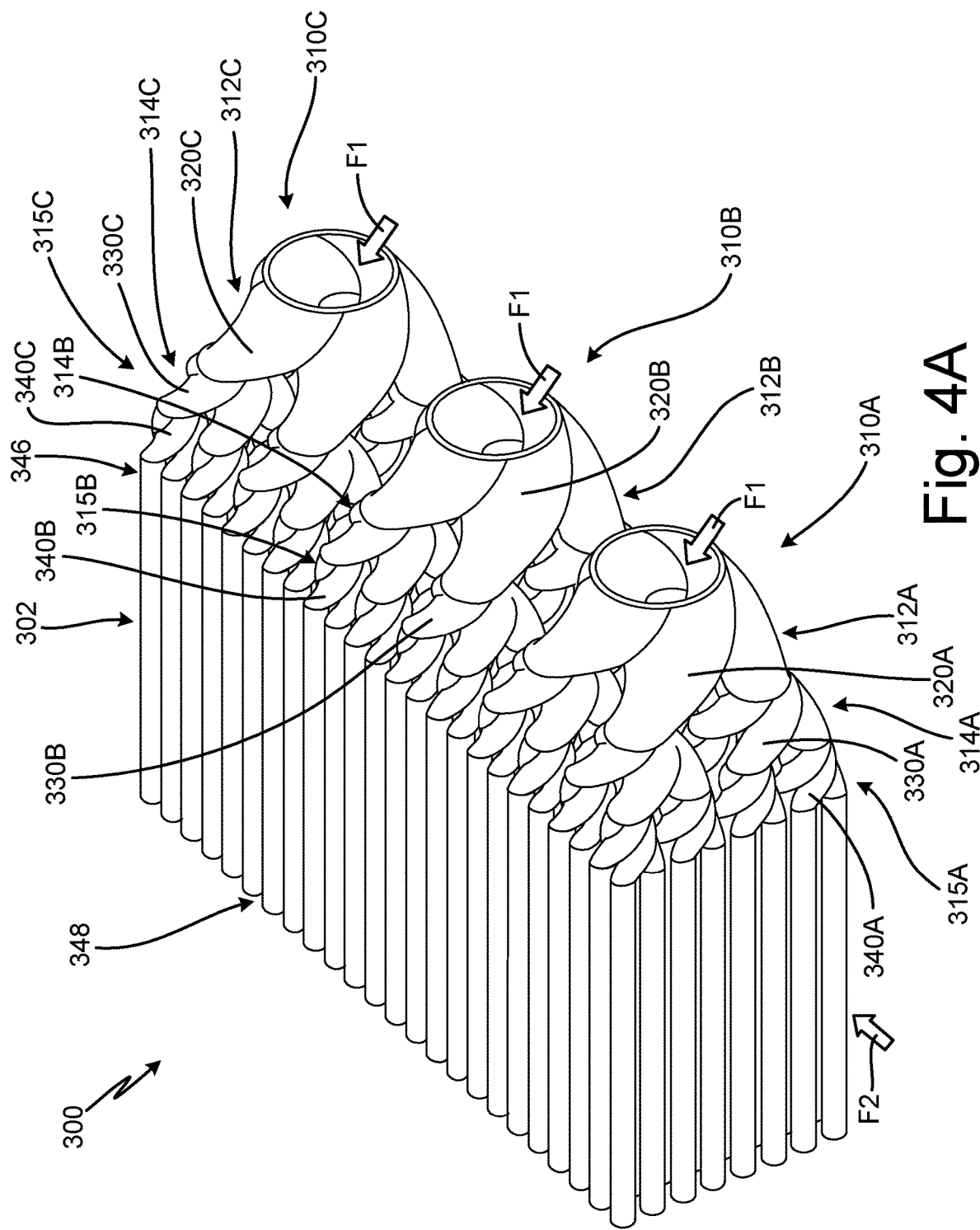
FIG. 4A is an isometric cut-away view of a heat exchanger including a core and multiple headers arranged in parallel.
Figure 4B:
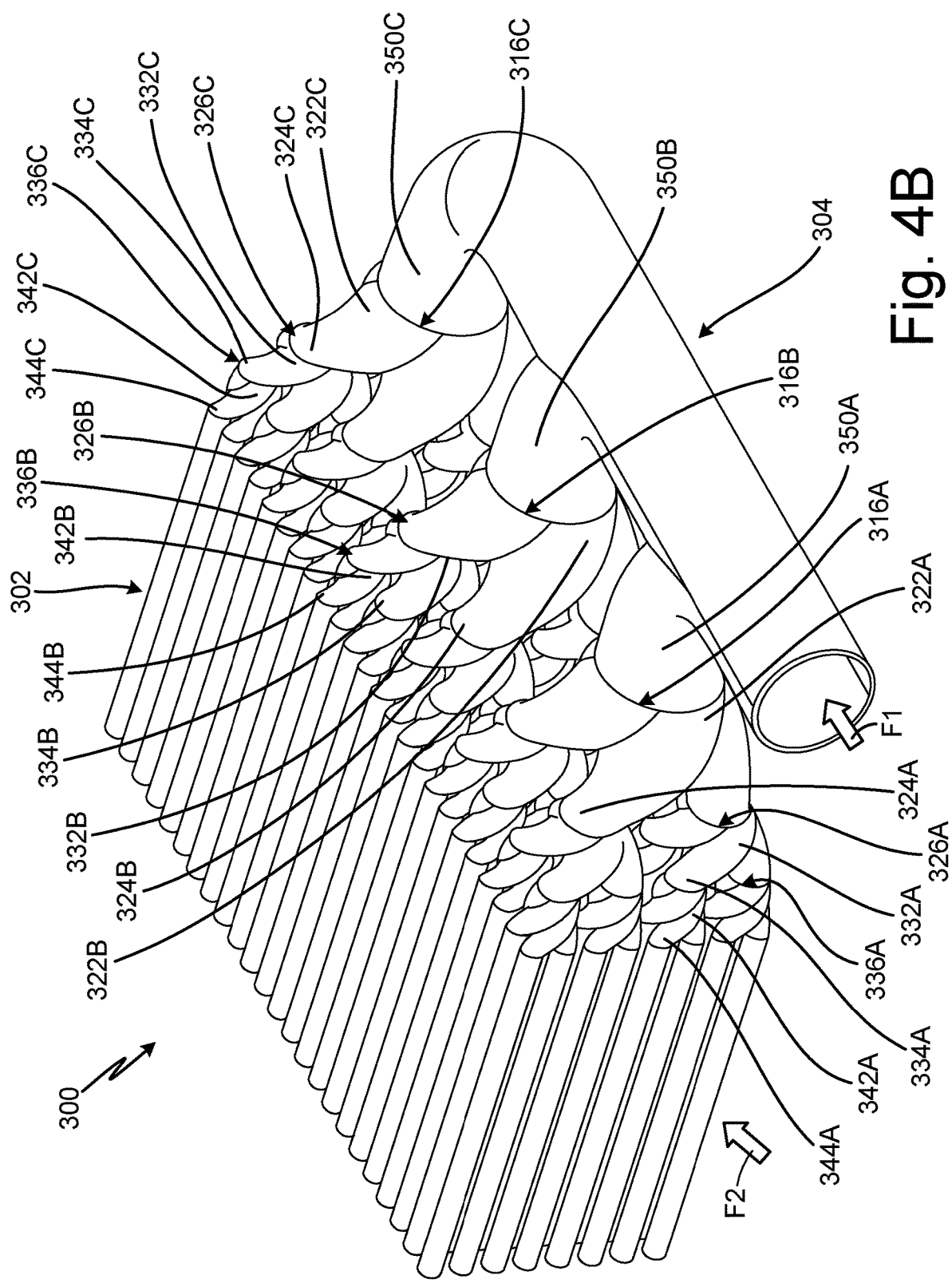
FIG. 4B is an isometric view of a heat exchanger assembled with a connector duct.

With continued reference to FIGS. 1A, 1B, and 1C, heat exchanger header 10 is configured to permit the transfer of heat between first fluid F1 and second fluid F2 (FIGS. 4A and 4B). First fluid F1 and second fluid F2 can be any type of fluid, including air, water, lubricant, fuel, or another fluid. Header 10 is described herein as providing heat transfer from first fluid F1 to second fluid F2; therefore, first fluid F1 can be at a greater temperature than second fluid F2 at the point where first fluid F1 enters header 10. However, other heat exchange configurations of header 10 can include second fluid F2 at a greater temperature than first fluid F1.

In the example of FIGS. 1A, 1B, and 1C, header 10 is shown receiving first fluid F1 at first branched region 16. Header 10 can discharge first fluid F1 distal to first branched region 16 (e.g., into a heat exchanger core, as described below with reference to FIGS. 4A and 4B). In other examples, the direction of flow of first fluid F1 can be reversed such that first fluid F1 exits header 10 at first branched region 16. Header 10 can be configured to interact with an additional fluid (e.g., second fluid F2, not shown) along axes parallel or perpendicular to a central axis of header 10 (i.e., in a counter-flow or cross-flow arrangement, respectively).

In operation, first branched region 16 of header 10 is configured to receive or discharge first fluid F1 from/to another component or duct. First fluid F1 entering header 10 at first branched region 16 is channeled through spiral first fluid channels 20 to second branched regions 26. At second branched regions 26, first fluid F1 is channeled out from each second branched region 26 to flow into spiral second fluid channels 30. First fluid F1 can become turbulent as it flows along first spiral paths P1 within first fluid channels 20 and along second spiral paths P2 within second fluid channels 30. First fluid F1 can flow from second fluid channels 30 into additional downstream stages of branching within header 10 (e.g., as is described in greater detail below with respect to FIG. 2) or into a heat exchanger core (e.g., as is described in greater detail below with respect to FIGS. 4A and 4B). Alternatively, the flow direction of first fluid F1 can be reversed. Heat transfer between first fluid F1 and second fluid F2 (not shown) can occur along the walls or internal surface area of first fluid channels 20 and second fluid channels 30 as first fluid F1 flows through header 10.

Header 10 can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a header and core). However, it should be understood that other suitable manufacturing processes can be used.

During an additive manufacturing process, header 10 can be formed layer by layer to achieve varied tubular dimensions (e.g., cross-sectional area, wall thicknesses, curvature, etc.) and complex internal passages. Each additively manufactured layer creates a new horizontal build plane to which a subsequent layer of header 10 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, header 10 can be additively manufactured as a single, monolithic unit. FIGS. 1A, 1B, and 1C show header 10 already fully manufactured. Thus, first horizontal plane H1 and second horizontal plane H2 can represent horizontal planes corresponding to previous build planes as header 10 was manufactured.

Additive manufacturing build processes (e.g., of header 10) can be limited by build angle requirements, particularly if the structure will be unsupported during a build. Supports can be added to a structure to enable a build, but these supports can be time-consuming or impossible to remove. Supports that remain during operation of an additively manufactured heat exchanger header can negatively affect thermal and structural performance. The spiral geometry of header 10 allows for longer fluid channels (e.g., first fluid channels 20 and second fluid channels 30) to be packaged into header 10 without the need for additional supports during additive manufacturing or an increase in the overall length of the header.

In general, the spiral fractal geometry of header 10 retains the benefits of straight fractal geometry compared to traditional heat exchanger header configurations. Traditional heat exchanger headers, such as those with box-shaped manifolds, can have increased stress concentration at corners of the manifold where there is geometry discontinuity. The branching pattern of fractal heat exchanger headers can reduce this geometry discontinuity. Furthermore, each fluid channel (e.g., first fluid channels 20 and second fluid channels 30) in a fractal heat exchanger header (e.g., header 10) behaves like a slim beam with low stiffness in transverse directions and reduced stiffness in horizontal directions due to the curved shape at each branched region. Thus, fractal heat exchanger headers have increased compliance (i.e., reduced stiffness) and experience less thermal stress compared to traditional heat exchanger header configurations. Fractal heat exchanger headers also have higher pressure capabilities due to the mainly circular walls of each channel.

Further, the spiral geometry of spiral fractal header 10 allows for longer fluid channels (e.g., first fluid channels 20 and second fluid channels 30) to be manufactured at an optimal build angle (e.g., rotational angles α1 and α2) compared to a straight fractal header of the same overall height and build angle. Longer first fluid channels 20 and second fluid channels 30 increase the structural compliance of header 10 and thereby reduce thermal stress. Similarly, spiral fractal header 10 can have a longer effective flow length along first spiral paths P1 and second spiral paths P2 due to increased internal surface area compared to a straight fractal header of the same overall height. The increased flow length and non-straight paths can create further turbulence and pressure drop in first fluid F1 as it flows through header 10, which can result in improved heat transfer. The spiral geometry of header 10 can also reduce the amount of external open space between individual first fluid channels 20 and second fluid channels 30 at each respective branching stage thereby reducing the amount of external flow that bypasses first fluid channels 20 and second fluid channels 30 (as compared to the fluid channels of a traditional straight fractal header). Thus, header 10 can be tuned for increased heat transfer between first fluid F1 and a second fluid (e.g., second fluid F2 as shown in FIGS. 4A and 4B) flowing through the open space. Moreover, the change in pressure of flow (of first fluid F1) through header 10 can be tuned by changing the helical pitch, rotational angle, and length of first fluid channels 20 and/or second fluid channels 30 to maximize overall thermal performance. Alleviating thermal stress and improving performance can also extend the service life of heat exchangers.

Figure 2:
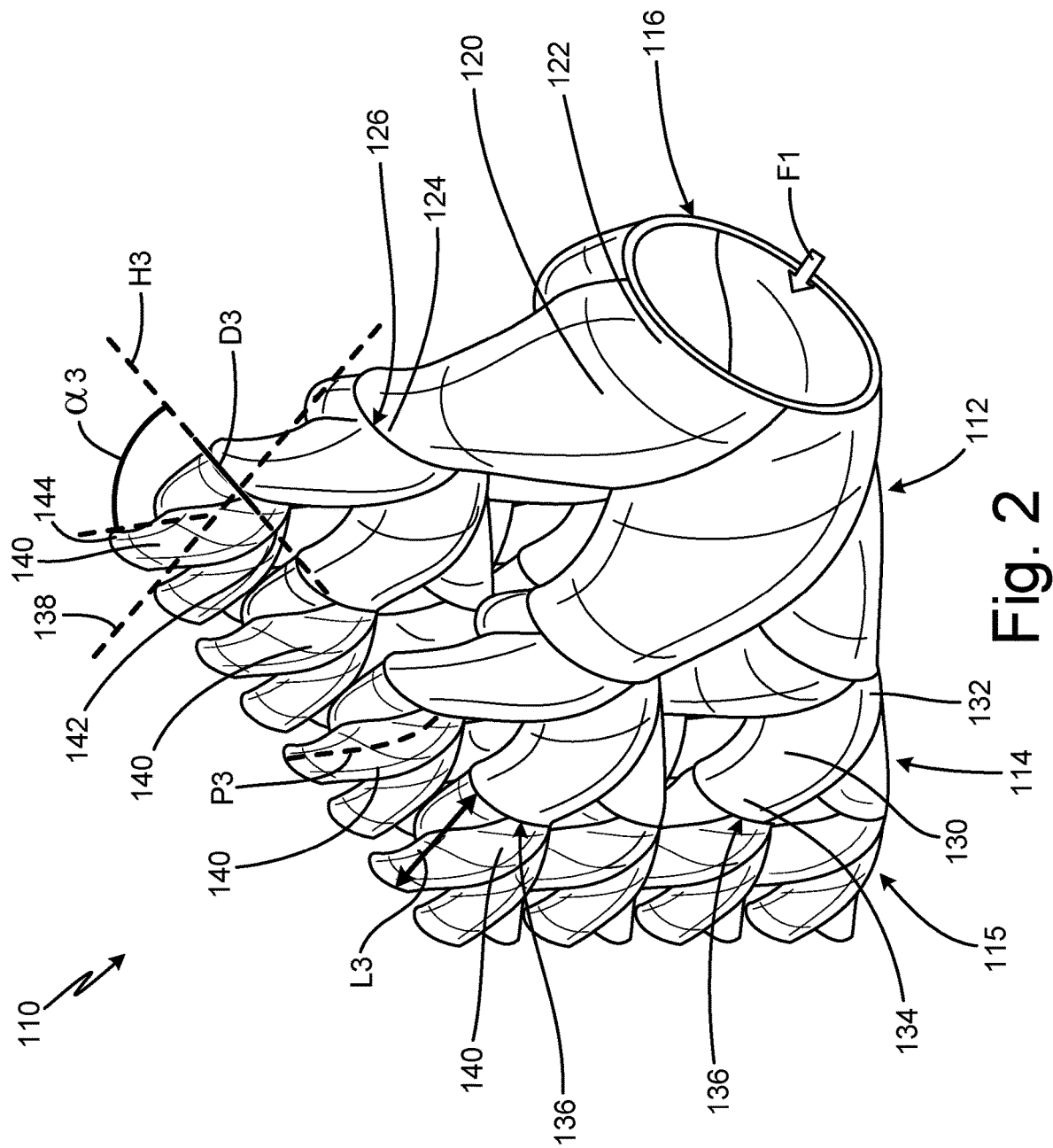
FIG. 2 is an isometric view of a heat exchanger header showing additional stages of branching.

FIG. 2 is an isometric view of heat exchanger header 110 showing additional stages of branching. Heat exchanger header 110 includes first stage 112, second stage 114, and third stage 115. First stage 112 includes first branched region 116 with first common axis (not shown) and first fluid channels 120. Each of first fluid channels 120 includes first end 122 and second end 124. Second stage 114 includes second branched regions 126 with second common axes (not shown) and second fluid channels 130. Each of second fluid channels 130 includes first end 132 and second end 134. Third stage 115 includes third branched regions 136 with third common axes 138 and third fluid channels 140. Each of third fluid channels 140 includes first end 142 and second end 144. Third fluid channels 140 define third spiral paths P3, third helical diameters D3, third lengths L3, and third rotational angles α3 with respect to third horizontal plane H3.

First stage 112 has the same structure and function as described above with reference to first stage 12 in FIGS. 1A, 1B, and 1C. Second stage 114 has the same structure and function as described above with reference to second stage 14 in FIGS. 1A, 1B, and 1C. Header 110 additionally includes third stage 115.

Second stage 114 is connected to third stage 115 at each of second ends 134 (of second fluid channels 130). Third stage 115 is a third level or layer of branching within header 110. Third branched regions 136 extend from second ends 134 of second fluid channels 130. Specifically, each of second ends 134 is connected to one third branched region 136, such that each of third branched regions 136 is connected to one second end 134. Thus, the ratio of second ends 134 to third branched regions 136 can be 1:1. For example, as shown in FIG. 2, sixteen second fluid channels 130 with second ends 134 can connect to sixteen third branched regions 136. Further, the total cross-sectional area of header 110 as measured through third branched regions 136 can be equal to the cross-sectional area as measured through each of first branched region 116 and second branched regions 126, such that an initial cross-sectional area of each stage (i.e., first stage 112, second stage 114, and third stage 115) of header 110 remains constant between subsequent stages.

Each third branched region 136 branches into third fluid channels 140, such that each third branched region 136 defines a corresponding unit or bundle of third fluid channels 140. For example, the illustrated embodiment includes sixteen units of third fluid channels 140 corresponding to sixteen third branched regions 136. Third fluid channels 140 are tubular. In the embodiment shown in FIG. 2, header 110 has a fractal geometry and each of third branched regions 136 branches into four individual third fluid channels 140 (for a total of sixty-four third fluid channels 140). In other embodiments, third branched regions 136 can branch into any number of third fluid channels 140. In yet other embodiments, the number of third fluid channels 140 extending from a particular third branched region 136 can vary among third branched regions 136.

Third fluid channels 140 are connected to third branched regions 136 at first ends 142. In particular, first ends 142 of third fluid channels 140 form structural portions of a corresponding third branched region 136. For example, the walls of third fluid channels 140 (at first ends 142) can merge at a corresponding third branched region 136. Thus, each third branched region 136 can define a common plenum or interior space within header 110 that is continuous with an interior of the corresponding third fluid channels 140.

Each of third fluid channels 140 within a unit of third stage 115 is wound into a spiral or helix to define a corresponding third spiral path P3. In this embodiment, third spiral paths P3 are helical paths, each of which can have the same helical pitch, third helical diameter D3 (as measured adjacent to the corresponding third branched region 136 at first ends 142), and helical twist direction (e.g., right-handed or left-handed). Third spiral paths P3 can be conical spirals or any other suitable spiral or helical geometry. In the example shown in FIG. 2, each of third fluid channels 140 has a right-handed helical twist direction (i.e., third fluid channels 140 curve in a clockwise direction), though it should be appreciated that each of third fluid channels 140 can alternatively have a left-handed helical twist direction (i.e., third fluid channels 140 can curve in a counter-clockwise direction).

Each unit of third fluid channels 140 shares a third common axis 138. Third common axes 138 are longitudinal axes passing through a center of each third branched region 136. Thus, each third common axis 138 can form a central helical axis for corresponding third spiral paths P3. Each of third common axes 138 can be parallel. Further, each of third common axes 138 can be parallel to each of first common axis 118 and second common axes 128. Helical pitch can refer to the number of turns or revolutions of a given one of third spiral paths P3 around a corresponding third common axis 138 for a fixed length along that third common axis 138. Each third fluid channel 140 also defines third length L3 measured along a line drawn parallel to the corresponding third common axis 138 from first ends 142 to second ends 144. Due to the spiral shape of third fluid channels 140, third spiral paths P3 of spirally or helically wound third fluid channels 140 always have a greater length than the corresponding third length L3 of the same third fluid channel 140.

Although the helical pitch, helical diameter, size, and spacing of third fluid channels 140 are illustrated in FIG. 2 as being uniform among each unit of third fluid channels 140, it should be appreciated that such parameters may vary between individual third fluid channels 140 or even along third spiral paths P3 depending on the application and/or the characteristics of the heat exchange fluid to be passed through third fluid channels 140. For example, the helical pitch of third fluid channels 140 may be uniform or may vary along third spiral paths P3. In addition, each of third fluid channels 140 may have a similar or different size, spacing, etc. According to the illustrated embodiment, third fluid channels 140 all have substantially the same cross-sectional area at corresponding points along third spiral paths P3. The cross-sectional area of each individual third fluid channel 140 can be substantially constant or can vary from first end 142 to second end 144. In particular, the cross-sectional area of each individual third fluid channel 140 can decrease from first end 142 to second end 144, such that each of third fluid channels 140 is tapered toward second end 144. Moreover, the cross-sectional area of each of third fluid channels 140 can be substantially circular. However, it should be appreciated that the cross-sectional area and the geometry of the cross sections of third fluid channels 140 can be uniform or may vary from channel to channel or along third spiral paths P3 of a particular third fluid channel 140. It should also be appreciated that the cross-sectional area of each third fluid channel 140 need not be circular and can alternatively be oval, polygonal, irregular, or any other suitable cross-sectional shape. Furthermore, any of the helical pitch, helical diameter, size, and spacing of third fluid channels 140 can be the same as or different from the helical pitch, helical diameter, size, and spacing of first fluid channels 120 and/or second fluid channels 130.

Each of third spiral paths P3 also defines a corresponding third rotational angle $\alpha 3$ (i.e., helical angle) based on the third helical diameter D3 and the helical pitch of the individual third spiral path P3. Specifically, each third rotational angle $\alpha 3$ is formed by a tangent line taken at a point along the corresponding third spiral path P3 and measured with respect to third horizontal plane H3. Third horizontal plane H3 can be perpendicular to third common axes 138 and include third helical diameters D3. Third horizontal plane H3 can be parallel to first horizontal plane H1 and/or second horizontal plane H2. Each of third rotational angles $\alpha 3$ can be the same. In other embodiments, third rotational angles $\alpha 3$ can vary among units of third fluid channels 140. Each of third rotational angles $\alpha 3$ can also be the congruent to each of first rotational angles $\alpha 1$ and/or second rotational angles $\alpha 2$. Moreover, each of third rotational angles $\alpha 3$ can be between 30 and 70 degrees depending on the overall geometry of header 110, material characteristics, and manufacture process parameters. For example, each of third rotational angles $\alpha 3$ can be equal to 45 degrees.

Second ends 144 of third fluid channels 140 can form an end of header 110 that is distal to first branched region 116. Second ends 144 of third fluid channels 140 can be connected to additional stages of branching within header 110 or to a heat exchanger core (e.g., as is described in greater detail below with respect to FIGS. 4A and 4B).

In operation, first branched region 116 of header 110 is configured to receive or discharge first fluid F1 from/to another component or duct. First fluid F1 entering header 110 at first branched region 116 is channeled through spiral first fluid channels 120 to second branched regions 126. At second branched regions 126, first fluid F1 is channeled out from each second branched region 126 to flow through spiral second fluid channels 130 to third branched regions 136. At third branched regions 136, first fluid F1 is channeled out from each third branched region 136 to flow into spiral third fluid channels 140. First fluid F1 can become turbulent as it flows along first spiral paths P1 within first fluid channels 120, along second spiral paths P2 within second fluid channels 130, and along third spiral paths P3 within third fluid channels 140. First fluid F1 can flow from third fluid channels 140 into additional downstream stages of branching within header 110 or into a heat exchanger core (e.g., as is described in greater detail below with respect to FIGS. 4A and 4B). Alternatively, the flow direction of first fluid F1 can be reversed. Heat transfer between first fluid F1 and second fluid F2 (not shown) can occur along the walls or internal surface area of first fluid channels 120, second fluid channels 130, and third fluid channels 140 as first fluid F1 flows through header 110.

Header 110 can be formed partially or entirely by additive manufacturing, including by any of the exemplary additive manufacturing processes described above with reference to FIGS. 1A, 1B, and 1C, or by any other suitable manufacturing process. During an additive manufacturing process, header 110 can be formed layer by layer to achieve varied tubular dimensions (e.g., cross-sectional area, wall thicknesses, curvature, etc.) and complex internal passages. Each additively manufactured layer creates a new horizontal build plane to which a subsequent layer of header 110 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, header 110 can be additively manufactured as a single, monolithic unit.

Additive manufacturing build processes (e.g., of header 110) can be limited by build angle requirements, particularly if the structure will be unsupported during a build. Supports can be added to a structure to enable a build, but these supports can be time-consuming or impossible to remove. Supports that remain during operation of an additively manufactured heat exchanger header can negatively affect thermal and structural performance. The spiral geometry of header 110 allows for longer fluid channels (e.g., first fluid channels 120, second fluid channels 130, and third fluid channels 140) to be packaged into header 110 without the need for additional supports during additive manufacturing or an increase in the overall length of the header.

In general, the spiral fractal geometry of header 110 retains the benefits of straight fractal geometry compared to traditional heat exchanger header configurations. Traditional heat exchanger headers, such as those with box-shaped manifolds, can have increased stress concentration at corners of the manifold where there is geometry discontinuity. The branching pattern of fractal heat exchanger headers can reduce this geometry discontinuity. Furthermore, each fluid channel (e.g., first fluid channels 120, second fluid channels 130, and third fluid channels 140) in a fractal heat exchanger header (e.g., header 110) behaves like a slim beam with low stiffness in transverse directions and reduced stiffness in horizontal directions due to the curved shape at each branched region. Thus, fractal heat exchanger headers have increased compliance (i.e., reduced stiffness) and experience less thermal stress compared to traditional heat exchanger header configurations. Fractal heat exchanger headers also have higher pressure capabilities due to the mainly circular walls of each channel.

Further, the spiral geometry of spiral fractal header 110 allows for longer fluid channels (e.g., first fluid channels 120, second fluid channels 130, and third fluid channels 140) to be manufactured at an optimal build angle (e.g., rotational angles α1, α2, and α3) compared to a straight fractal header of the same overall height and build angle. Longer first fluid channels 120, second fluid channels 130, and third fluid channels 140 increase the structural compliance of header 110 and thereby reduce thermal stress. Similarly, spiral fractal header 110 can have a longer effective flow length along first spiral paths P1, second spiral paths P2, and third spiral paths P3 due to increased internal surface area compared to a straight fractal header of the same overall height. The increased flow length and non-straight paths can create further turbulence and pressure drop in first fluid F1 as it flows through header 110, which can result in improved heat transfer. The spiral geometry of header 110 can also reduce the amount of external open space between individual first fluid channels 120, second fluid channels 130, and third fluid channels 140 at each respective branching stage thereby reducing the amount of external flow that bypasses first fluid channels 120, second fluid channels 130, and third fluid channels 140 (as compared to the fluid channels of a traditional straight fractal header). Thus, header 110 can be tuned for increased heat transfer between first fluid F1 and a second fluid (e.g., second fluid F2 as shown in FIGS. 4A and 4B) flowing through the open space. Moreover, the change in pressure of flow (of first fluid F1) through header 110 can be tuned by changing the helical pitch, rotational angle, and length of first fluid channels 120, second fluid channels 130, and/or third fluid channels 140 to maximize overall thermal performance. Alleviating thermal stress and improving performance can also extend the service life of heat exchangers.

Figure 3:
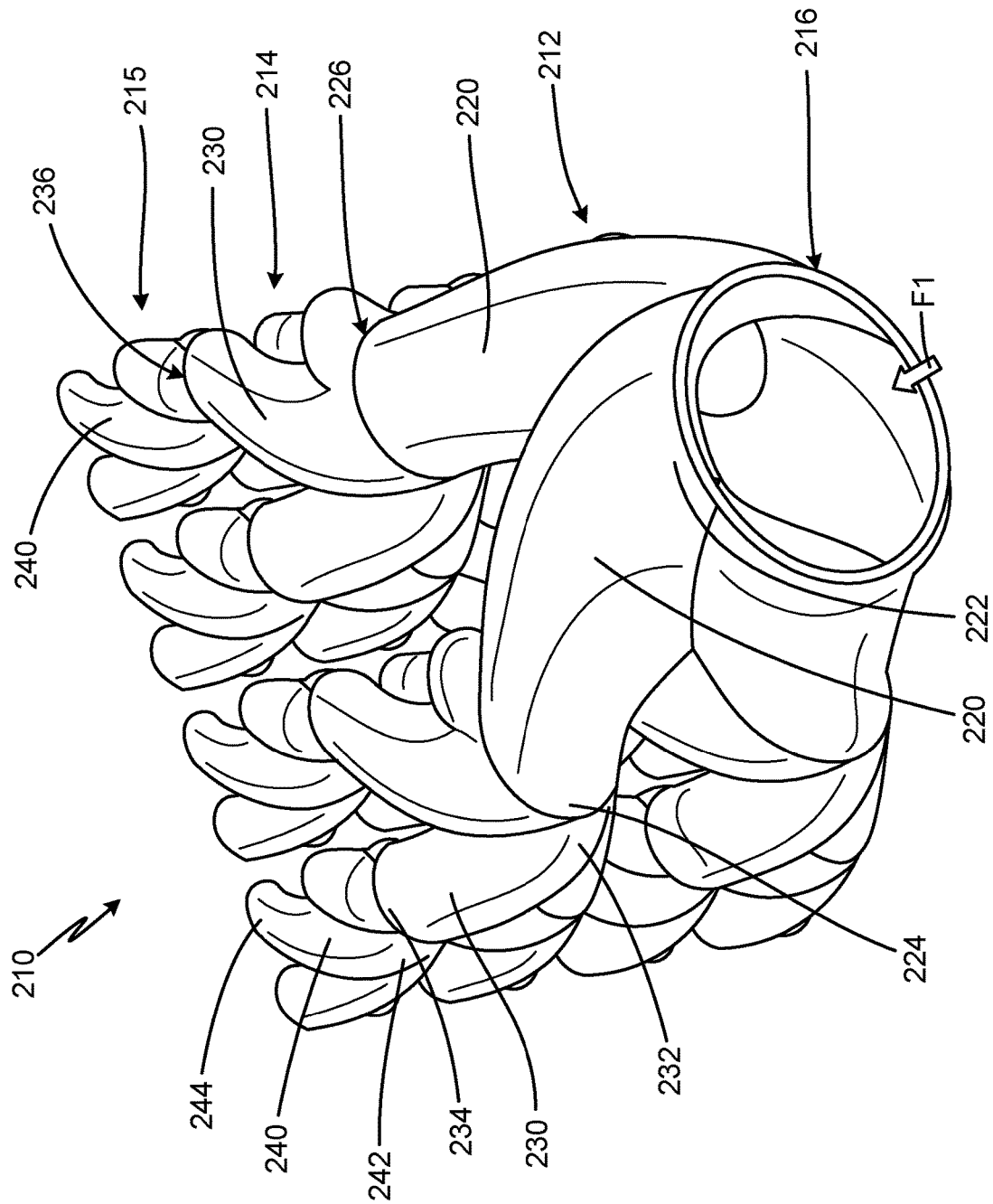
FIG. 3 is an isometric view of a heat exchanger header showing stages of branching with different rotational directions.

FIG. 3 is an isometric view of heat exchanger header 210 showing stages of branching with different rotational directions. Heat exchanger header 210 includes first stage 212, second stage 214, and third stage 215. First stage 212 includes first branched region 216 with first common axis (not shown) and first fluid channels 220. Each of first fluid channels 220 includes first end 222 and second end 224. Second stage 214 includes second branched regions 226 with second common axes (not shown) and second fluid channels 230. Each of second fluid channels 230 includes first end 232 and second end 234. Third stage 215 includes third branched regions 236 with third common axes (not shown) and third fluid channels 240. Each of third fluid channels 240 includes first end 242 and second end 244.

First stage 212 has the same structure and function as described above with reference to first stage 12 in FIGS. 1A, 1B, and 1C except that first fluid channels 220 have an opposite helical twist direction. Second stage 214 has the same structure and function as described above with reference to second stage 14 in FIGS. 1A, 1B, and 1C. Third stage 215 has the same structure and function as described above with reference to third stage 115 in FIG. 2.

In the example shown in FIG. 3, each of first fluid channels 220 has a left-handed helical twist direction (i.e., first fluid channels 220 curve in a counter-clockwise direction), rather than a right-handed (i.e., clockwise) helical twist direction. Further, each of second fluid channels 230 has a right-handed helical twist direction, and each of third fluid channels 240 has a right-handed helical twist direction. Accordingly, the helical twist direction of the channels in any stage of header 210 (e.g., first stage 212, second stage 214, and/or third stage 215) can the same or different from the helical twist direction of adjacent header stages. In other words, helical twist direction can be uniform (i.e., all of first fluid channels 220, second fluid channels 230, and third fluid channels 240 have the same helical twist direction) throughout header 210 or can vary among stages or even among units within a particular stage.

In operation, first branched region 216 of header 210 is configured to receive or discharge first fluid F1 from/to another component or duct. First fluid F1 entering header 210 at first branched region 216 is channeled through spiral first fluid channels 220 to second branched regions 226. At second branched regions 226, first fluid F1 is channeled out from each second branched region 226 to flow through spiral second fluid channels 230 to third branched regions 236. At third branched regions 236, first fluid F1 is channeled out from each third branched region 236 to flow into spiral third fluid channels 240. First fluid F1 can become turbulent as it flows along the spiral paths of first fluid channels 220, second fluid channels 230, and third fluid channels 240. First fluid F1 can flow from third fluid channels 240 into additional downstream stages of branching within header 210 or into a heat exchanger core (e.g., as is described in greater detail below with respect to FIGS. 4A and 4B). Alternatively, the flow direction of first fluid F1 can be reversed. Heat transfer between first fluid F1 and second fluid F2 (not shown) can occur along the walls or internal surface area of first fluid channels 220, second fluid channels 230, and third fluid channels 240 as first fluid F1 flows through header 210.

Header 210 can be formed partially or entirely by additive manufacturing, including by any of the exemplary additive manufacturing processes described above with reference to FIGS. 1A, 1B, and 1C, or by any other suitable manufacturing process. During an additive manufacturing process, header 210 can be formed layer by layer to achieve varied tubular dimensions (e.g., cross-sectional area, wall thicknesses, curvature, etc.) and complex internal passages. Each additively manufactured layer creates a new horizontal build plane to which a subsequent layer of header 210 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, header 210 can be additively manufactured as a single, monolithic unit.

Additive manufacturing build processes (e.g., of header 210) can be limited by build angle requirements, particularly if the structure will be unsupported during a build. Supports can be added to a structure to enable a build, but these supports can be time-consuming or impossible to remove. Supports that remain during operation of an additively manufactured heat exchanger header can negatively affect thermal and structural performance. The spiral geometry of header 210 allows for longer fluid channels (e.g., first fluid channels 220, second fluid channels 230, and third fluid channels 240) to be packaged into header 210 without the need for additional supports during additive manufacturing or an increase in the overall length of the header.

In general, the spiral fractal geometry of header 210 retains the benefits of straight fractal geometry compared to traditional heat exchanger header configurations. Traditional heat exchanger headers, such as those with box-shaped manifolds, can have increased stress concentration at corners of the manifold where there is geometry discontinuity. The branching pattern of fractal heat exchanger headers can reduce this geometry discontinuity. Furthermore, each fluid channel (e.g., first fluid channels 220, second fluid channels 230, and third fluid channels 240) in a fractal heat exchanger header (e.g., header 210) behaves like a slim beam with low stiffness in transverse directions and reduced stiffness in horizontal directions due to the curved shape at each branched region. Thus, fractal heat exchanger headers have increased compliance (i.e., reduced stiffness) and experience less thermal stress compared to traditional heat exchanger header configurations. Fractal heat exchanger headers also have higher pressure capabilities due to the mainly circular walls of each channel.

Further, the spiral geometry of spiral fractal header 210 allows for longer fluid channels (e.g., first fluid channels 220, second fluid channels 230, and third fluid channels 240) to be manufactured at an optimal build angle compared to a straight fractal header of the same overall height and build angle. Longer first fluid channels 220, second fluid channels 230, and third fluid channels 240 increase the structural compliance of header 210 and thereby reduce thermal stress. Similarly, spiral fractal header 210 can have a longer effective flow length along the spiral paths due to increased internal surface area compared to a straight fractal header of the same overall height. The increased flow length and non-straight paths can create further turbulence and pressure drop in first fluid F1 as it flows through header 210, which can result in improved heat transfer. The spiral geometry of header 210 can also reduce the amount of external open space between individual first fluid channels 220, second fluid channels 230, and third fluid channels 240 at each respective branching stage thereby reducing the amount of external flow that bypasses first fluid channels 220, second fluid channels 230, and third fluid channels 240 (as compared to the fluid channels of a traditional straight fractal header). Thus, header 210 can be tuned for increased heat transfer between first fluid F1 and a second fluid (e.g., second fluid F2 as shown in FIGS. 4A and 4B) flowing through the open space. Moreover, the change in pressure of flow (of first fluid F1) through header 210 can be tuned by changing the helical pitch, rotational angle, and length of first fluid channels 220, second fluid channels 230, and/or third fluid channels 240 to maximize overall thermal performance. Alleviating thermal stress and improving performance can also extend the service life of heat exchangers.

FIG. 4A is an isometric cut-away view of heat exchanger 300 including core 302 and multiple headers 310A, 310B, 310C arranged in parallel. FIG. 4B is an isometric view of heat exchanger 300 assembled with connector duct 304. FIGS. 4A and 4B will be discussed together. Heat exchanger 300 includes core 302, connector duct 304, and headers 310A, 310B, and 310C. (Each of headers 310A, 310B, and 310C includes essentially the same components, which are labeled respectively with A, B, or C but which will be referred to generally herein by the shared reference number. For example, first stage 312 refers collectively to first stages 312A, 312B, and 312C.) Each of headers 310 include first stage 312, second stage 314, and third stage 315. First stage 312 includes first branched region 316 with first common axis (not shown) and first fluid channels 320. Each of first fluid channels 320 includes first end 322 and second end 324. Second stage 314 includes second branched regions 326 with second common axes (not shown) and second fluid channels 330. Each of second fluid channels 330 includes first end 332 and second end 334. Third stage 315 includes third branched regions 336 with third common axes (not shown) and third fluid channels 340. Each of third fluid channels 340 includes first end 342 and second end 344. Core 302 includes first side 346 and second side 348. Connector duct 304 includes subsidiary ducts 350A, 350B, and 350C.

First stages 312 each have the same structure and function as described above with reference to first stage 12 in FIGS. 1A, 1B, and 1C. Second stages 314 each have the same structure and function as described above with reference to second stage 14 in FIGS. 1A, 1B, and 1C. Third stages 315 each have the same structure and function as described above with reference to third stage 115 in FIG. 2. Heat exchanger 300 additionally includes core 302, connector duct 304, and multiple headers 310 rather than a single header.

Connector duct 304 is an initial tubular duct or plenum of heat exchanger 300. Connector duct 304 branches into subsidiary ducts 350A, 350B, and 350C, which are also tubular. Subsidiary ducts 350 can extend radially from connector duct 304 at different points axially along the length of connector duct 304. Each subsidiary duct 350 connects to a corresponding one of headers 310A, 310B, and 310C. In the example shown in FIG. 4B, subsidiary duct 350A connects to header 310A, subsidiary duct 350B connects to header 310B, and subsidiary duct 350C connects to header 310C. Specifically, each of subsidiary ducts 350 can connect to one of headers 310 at the corresponding first branched region 316. The illustrated embodiment shows three headers 310 connected to three corresponding subsidiary ducts 350; however, it should be appreciated that alternative embodiments can include more or fewer headers 310 connected to connector duct 304 by any suitable number of subsidiary ducts 350. Furthermore, each of subsidiary ducts 350 can extend from connector duct 304 at the same angle (as shown in FIG. 4B), such that headers 310 all extend along the same plane, or at different angles, such that headers 310 are arranged along different planes.

Core 302 is a heat exchanger core that extends between first side 346 and second side 348. In the examples of FIGS. 4A and 4B, core 302 is shown as having a three-dimensional array of channels or tubes arranged in straight paths, but it should be appreciated that alternative embodiments can include any other suitable core types and/or geometries. Core 302 is connected to each of headers 310 at first side 346. Core 302 can be connected to each of headers 310 at a region of headers 310 that is distal to first branched regions 316. As shown in FIGS. 4A and 4B, core 302 can be connected to each of headers 310 at second end 344 of each of third fluid channels 340. In particular, each of third fluid channels 340 can be directly connected to and continuous with a fluid channel of core 302. Alternatively, headers 310 can include more or fewer stages of branching, and, thus, headers 310 can connect to core 302 at a different stage (e.g., at second ends 334 of second fluid channels 330 in a two-stage embodiment of headers 310). In the embodiment shown in FIGS. 4A and 4B, the connection between third fluid channels 340 and core 302 forms a straight path. However, it should be understood that alternate embodiments can include other three-dimensional geometries at the interface between headers 310 and core 302, such as curved regions or separations between channels or headers. Core 302 can also be connected to additional headers or other features at second side 348.

In operation, connector duct 304 of heat exchanger 300 is configured to receive or discharge first fluid F1 from/to another component or duct. First fluid F1 can flow within connector duct 304 and out through subsidiary ducts 350 to each of headers 310. Thus, connector duct 304 is a means for supplying first fluid F1 from a single source to multiple headers 310. As such, headers 310 are configured to provide heat exchange in parallel rather than in series.

First fluid F1 entering headers 310 at first branched regions 316 is channeled through spiral first fluid channels 320 to second branched regions 326. At second branched regions 326, first fluid F1 is channeled out from each second branched region 326 to flow through spiral second fluid channels 330 to third branched regions 336. At third branched regions 336, first fluid F1 is channeled out from each third branched region 336 to flow into spiral third fluid channels 340. First fluid F1 can become turbulent as it flows along the spiral paths of first fluid channels 320, second fluid channels 330, and third fluid channels 340. First fluid F1 can flow from third fluid channels 340 into additional downstream stages of branching within headers 310 or directly into the tubular structure of core 302 at first side 346. Alternatively, the flow direction of first fluid F1 can be reversed. Heat transfer between first fluid F1 and second fluid F2 can occur at core 302 and along the walls or internal surface area of first fluid channels 320, second fluid channels 330, and third fluid channels 340 as first fluid F1 flows through headers 310. The illustrated embodiment shows heat exchanger 300 has a cross-flow arrangement; however, it should be appreciated that heat exchanger 300 can also interact with fluids along other axes (e.g., in a counter-flow arrangement).

Heat exchanger 300 (and/or any component parts, including headers 310) can be formed partially or entirely by additive manufacturing, including by any of the exemplary additive manufacturing processes described above with reference to FIGS. 1A, 1B, and 1C, or by any other suitable manufacturing process. During an additive manufacturing process, heat exchanger 300 can be formed layer by layer to achieve varied tubular dimensions (e.g., cross-sectional area, wall thicknesses, curvature, etc.) and complex internal passages. Each additively manufactured layer creates a new horizontal build plane to which a subsequent layer of heat exchanger 300 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, heat exchanger 300 (and/or any component parts, including headers 310) can be additively manufactured as a single, monolithic unit.

Additive manufacturing build processes (e.g., of headers 310) can be limited by build angle requirements, particularly if the structure will be unsupported during a build. Supports can be added to a structure to enable a build, but these supports can be time-consuming or impossible to remove. Supports that remain during operation of an additively manufactured heat exchanger header can negatively affect thermal and structural performance. The spiral geometry of headers 310 allows for longer fluid channels (e.g., first fluid channels 320, second fluid channels 330, and third fluid channels 340) to be packaged into headers 310 without the need for additional supports during additive manufacturing or an increase in the overall length of the header.

In general, the spiral fractal geometry of headers 310 of heat exchanger 300 retain the benefits of straight fractal geometry compared to traditional heat exchanger header configurations. Traditional heat exchanger headers, such as those with box-shaped manifolds, can have increased stress concentration at corners of the manifold where there is geometry discontinuity. The branching pattern of fractal heat exchanger headers, particularly wherein each fluid channel is individually and directly connected to a passage in the core as shown in FIGS. 4A and 4B, can reduce this geometry discontinuity. Furthermore, each fluid channel (e.g., first fluid channels 320, second fluid channels 330, and third fluid channels 340) in a fractal heat exchanger header (e.g., headers 310) behaves like a slim beam with low stiffness in transverse directions and reduced stiffness in horizontal directions due to the curved shape at each branched region. Thus, fractal heat exchanger headers have increased compliance (i.e., reduced stiffness) and experience less thermal stress compared to traditional heat exchanger header configurations. Fractal heat exchanger headers also have higher pressure capabilities due to the mainly circular walls of each channel.

Further, the spiral geometry of spiral fractal headers 310 allows for longer fluid channels (e.g., first fluid channels 320, second fluid channels 330, and third fluid channels 340) to be manufactured at an optimal build angle compared to a straight fractal header of the same overall height and build angle. Longer first fluid channels 320, second fluid channels 330, and third fluid channels 340 increase the structural compliance of headers 310 and thereby reduce thermal stress. Similarly, spiral fractal headers 310 can have a longer effective flow length along the spiral paths due to increased internal surface area compared to a straight fractal header of the same overall height. The increased flow length and non-straight paths can create further turbulence and pressure drop in first fluid F1 as it flows through headers 310, which can result in improved heat transfer. The spiral geometry of headers 310 can also reduce the amount of external open space between individual first fluid channels 320, second fluid channels 330, and third fluid channels 340 at each respective branching stage thereby reducing the amount of external flow that bypasses first fluid channels 320, second fluid channels 330, and third fluid channels 340 (as compared to the fluid channels of a traditional straight fractal header). Thus, headers 310 can be tuned for increased heat transfer between first fluid F1 and second fluid F2 flowing through the open space. Moreover, the change in pressure of flow (of first fluid F1) through headers 310 can be tuned by changing the helical pitch, rotational angle, and length of first fluid channels 320, second fluid channels 330, and/or third fluid channels 340 to maximize overall thermal performance. Alleviating thermal stress and improving performance can also extend the service life of heat exchangers.

DISCUSSION OF POSSIBLE EMBODIMENTS

The following are non-exclusive descriptions of possible embodiments of the present invention.

A heat exchanger header includes a first stage with a first unit and a second stage with second units. The first unit includes a first branched region, a first common axis passing through a center of the first branched region, and first fluid channels extending from the first branched region. Each of the first fluid channels includes a first end forming a portion of the first branched region and a second end opposite the first end, wherein each of the first fluid channels defines a first spiral path with respect to the first common axis. Each of the second units includes a second branched region, a second common axis passing through a center of the second branched region, and second fluid channels extending from the second branched region. Each of the second fluid channels includes a first end forming a portion of the second branched region and a second end opposite the first end, wherein each of the second fluid channels defines a second spiral path with respect to the second common axis. Each of the second ends of the first fluid channels is connected to one of the second branched regions, such that each of the second branched regions is connected to one of the second ends of the first fluid channels.

The heat exchanger header of the preceding paragraph can optionally include, additionally and/or alternatively, any one or more of the following features, configurations and/or additional components:

Each of the first spiral paths can be a first helical path defining a first helical diameter adjacent the first branched region, a first helical pitch, and a first rotational angle, and each of the second helical paths can be a second helical path defining a second helical diameter adjacent the second branched region, a second helical pitch, and a second rotational angle.

The first rotational angles can be different from the second rotational angles.

Each of the first spiral paths can be a first conical spiral and each of the second spiral paths can be a second conical spiral.

The first common axis can be parallel to each of the second common axes.

Each of the first fluid channels and each of the second fluid channels can be tubular.

A total number of first fluid channels in the first unit can be equal to a total number of second fluid channels in each of the second units.

Each of the first spiral paths can curve in a first direction, and each of the second spiral paths can curve in a second direction that is opposite the first direction.

A cross-sectional area of each of the first fluid channels or each of the second fluid channels can be substantially constant from the first end to the second end.

A cross-sectional area of each of the first fluid channels or each of the second fluid channels can decrease from the first end to the second end, such that each of the first fluid channels or each of the second fluid channels can be tapered.

The heat exchanger header can further include a third stage with third units. Each of the third units can include a third branched region, a third common axis passing through a center of the third branched region, and third fluid channels extending from the third branched region. Each of the third fluid channels can include a first end forming a portion of the third branched region and a second end opposite the first end, wherein each of the third fluid channels can define a third spiral path with respect to the third common axis. Each of the second ends of the second fluid channels can be connected to one of the third branched regions, such that each of the third branched regions can be connected to one of the second ends of the second fluid channels.

A cross-sectional area of each of the first fluid channels, each of the second fluid channels, or each of the third fluid channels can be substantially constant from the first end to the second end, or can decrease from the first end to the second end, such that each of the first fluid channels, each of the second fluid channels, or each of the third fluid channels can be tapered.

The first branched region can be configured to receive or discharge a first fluid at a first temperature.

A method can include constructing the heat exchanger header utilizing an additive manufacturing process, wherein the heat exchanger header can be configured to be additively manufactured as a single, monolithic unit.

A heat exchanger includes headers and a core. Each of the headers includes a first stage with a first unit and a second stage with second units. The first unit includes a first branched region, a first common axis passing through a center of the first branched region, and first fluid channels extending from the first branched region. Each of the first fluid channels includes a first end forming a portion of the first branched region and a second end opposite the first end, wherein each of the first fluid channels defines a first spiral path with respect to the first common axis. Each of the second units includes a second branched region, a second common axis passing through a center of the second branched region, and second fluid channels extending from the second branched region. Each of the second fluid channels includes a first end forming a portion of the second branched region and a second end opposite the first end, wherein each of the second fluid channels defines a second spiral path with respect to the second common axis. Each of the second ends of the first fluid channels is connected to one of the second branched regions, such that each of the second branched regions is connected to one of the second ends of the first fluid channels. The core is connected to each of the headers distal to the first branched regions.

The heat exchanger of the preceding paragraph can optionally include, additionally and/or alternatively, any one or more of the following features, configurations and/or additional components:

The core can be connected to each of the headers at the second end of each of the second fluid channels, such that the headers can be connected to the core in parallel.

Each of the headers can further include a third stage with third units. Each of the third units can include a third branched region, a third common axis passing through a center of the third branched region, and third fluid channels extending from the third branched region. Each of the third fluid channels can include a first end forming a portion of the third branched region and a second end opposite the first end, wherein each of the third fluid channels can define a third spiral path with respect to the third common axis. Each of the second ends of the second fluid channels can be connected to one of the third branched regions, such that each of the third branched regions can be connected to one of the second ends of the second fluid channels.

The core can be connected to each of the headers at the second end of each of the third fluid channels, such that the headers can be connected to the core in parallel.

The first branched regions can be configured to receive or discharge a first fluid, the heat exchanger can be configured to interact with a second fluid, and the heat exchanger can define a first flow path of the first fluid that is perpendicular to a second flow path of the second fluid, such that the heat exchanger can have a cross-flow arrangement.

The heat exchanger can further include a connector duct connected to each of the headers at the first branched regions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger header comprising:
   a first stage with a first unit, the first unit including:
      a first branched region;
      a first common axis passing through a center of the first branched region; and
      first fluid channels extending from the first branched region, each of the first fluid channels including:
         a first end forming a portion of the first branched region; and
         a second end opposite the first end;
         wherein each of the first fluid channels defines a first spiral path with respect to the first common axis; and
   a second stage with second units, each of the second units including:
      a second branched region;
      a second common axis passing through a center of the second branched region; and
      second fluid channels extending from the second branched region, each of the second fluid channels including:
         a first end forming a portion of the second branched region; and
         a second end opposite the first end;
         wherein each of the second fluid channels defines a second spiral path with respect to the second common axis;
   wherein each of the second ends of the first fluid channels is connected to one of the second branched regions, such that each of the second branched regions is connected to one of the second ends of the first fluid channels.

2. The heat exchanger header of claim 1, wherein each of the first spiral paths is a first helical path defining a first helical diameter adjacent the first branched region, a first helical pitch, and a first rotational angle, and each of the second spiral paths is a second helical path defining a second helical diameter adjacent the second branched region, a second helical pitch, and a second rotational angle.

3. The heat exchanger header of claim 2, wherein the first rotational angles are different from the second rotational angles.

4. The heat exchanger header of claim 1, wherein each of the first spiral paths is a first conical spiral and each of the second spiral paths is a second conical spiral.

5. The heat exchanger header of claim 1, wherein the first common axis is parallel to each of the second common axes.

6. The heat exchanger header of claim 1, wherein each of the first fluid channels and each of the second fluid channels is tubular.

7. The heat exchanger header of claim 1, wherein a total number of first fluid channels in the first unit is equal to a total number of second fluid channels in each of the second units.

8. The heat exchanger header of claim 1, wherein each of the first spiral paths curves in a first direction, and each of the second spiral paths curves in a second direction that is opposite the first direction.

9. The heat exchanger header of claim 1, wherein a cross-sectional area of each of the first fluid channels or each of the second fluid channels is substantially constant from the first end to the second end.

10. The heat exchanger header of claim 1, wherein a cross-sectional area of each of the first fluid channels or each of the second fluid channels decreases from the first end to the second end, such that each of the first fluid channels or each of the second fluid channels is tapered.

11. The heat exchanger header of claim 1, further comprising:
   a third stage with third units, each of the third units including:
      a third branched region;
      a third common axis passing through a center of the third branched region; and
      third fluid channels extending from the third branched region, each of the third fluid channels including:

a first end forming a portion of the third branched region; and
a second end opposite the first end;
wherein each of the third fluid channels defines a third spiral path with respect to the third common axis;
wherein each of the second ends of the second fluid channels is connected to one of the third branched regions, such that each of the third branched regions is connected to one of the second ends of the second fluid channels.

12. The heat exchanger header of claim 11,
wherein a cross-sectional area of each of the first fluid channels, each of the second fluid channels, or each of the third fluid channels is substantially constant from the first end to the second end, or decreases from the first end to the second end, such that each of the first fluid channels, each of the second fluid channels, or each of the third fluid channels is tapered.

13. The heat exchanger header of claim 1,
wherein the first branched region is configured to receive or discharge a first fluid at a first temperature.

14. A method comprising:
constructing the heat exchanger header of claim 1 utilizing an additive manufacturing process;
wherein the heat exchanger header is configured to be additively manufactured as a single, monolithic unit.

15. A heat exchanger comprising:
headers, each of the headers including:
 a first stage with a first unit, the unit including:
  a first branched region;
  a first common axis passing through a center of the first branched region; and
  first fluid channels extending from the first branched region, each of the first fluid channels including:
   a first end forming a portion of the first branched region; and
   a second end opposite the first end;
   wherein each of the first fluid channels defines a first spiral path with respect to the first common axis; and
 a second stage with second units, each of the second units including:
  a second branched region;
  a second common axis passing through a center of the second branched region; and
  second fluid channels extending from the second branched region, each of the second fluid channels including:
   a first end forming a portion of the second branched region; and
   a second end opposite the first end;
   wherein each of the second fluid channels defines a second spiral path with respect to the second common axis;
wherein each of the second ends of the first fluid channels is connected to one of the second branched regions, such that each of the second branched regions is connected to one of the second ends of the first fluid channels; and
a core;
wherein the core is connected to each of the headers distal to the first branched regions.

16. The heat exchanger of claim 15,
wherein the core is connected to each of the headers at the second end of each of the second fluid channels, such that the headers are connected to the core in parallel.

17. The heat exchanger of claim 15,
wherein each of the headers further includes:
 a third stage with third units, each of the third units including:
  a third branched region;
  a third common axis passing through a center of the third branched region; and
  third fluid channels extending from the third branched region, each of the third fluid channels including:
   a first end forming a portion of the third branched region; and
   a second end opposite the first end;
   wherein each of the third fluid channels defines a third spiral path with respect to the third common axis;
wherein each of the second ends of the second fluid channels is connected to one of the third branched regions, such that each of the third branched regions is connected to one of the second ends of the second fluid channels.

18. The heat exchanger of claim 17,
wherein the core is connected to each of the headers at the second end of each of the third fluid channels, such that the headers are connected to the core in parallel.

19. The heat exchanger of claim 15,
wherein the first branched regions are configured to receive or discharge a first fluid, the heat exchanger is configured to interact with a second fluid, and the heat exchanger defines a first flow path of the first fluid that is perpendicular to a second flow path of the second fluid, such that the heat exchanger has a cross-flow arrangement.

20. The heat exchanger of claim 15, further comprising:
a connector duct connected to each of the headers at the first branched regions.

* * * * *